United States Patent [19]
Holmes

[11] 3,867,201
[45] Feb. 18, 1975

[54] HERMETICALLY SEALED ELECTROLYTE BATTERY AND METHOD OF FILLING WITHOUT BREAKING HERMETIC SEAL

[75] Inventor: Robert W. Holmes, Boston, Mass.

[73] Assignee: P. R. Mallory & Co., Inc., Indianapolis, Ind.

[22] Filed: Aug. 11, 1971

[21] Appl. No.: 170,888

[52] U.S. Cl. .................................. 136/114, 136/162
[51] Int. Cl. .......................................... H01m 21/10
[58] Field of Search ........... 136/162, 177, 178, 112, 136/114

[56]           References Cited
         UNITED STATES PATENTS

| | | | |
|---|---|---|---|
| 686,642 | 11/1901 | Wayte | 136/178 |
| 2,151,902 | 3/1939 | Domizi | 136/162 |
| 2,457,120 | 12/1948 | Brandon | 136/178 |
| 2,942,053 | 6/1960 | Baldwin et al. | 136/175 |
| 3,269,868 | 8/1966 | Carson | 136/112 |
| 3,410,323 | 11/1968 | Richard et al. | 136/162 |

Primary Examiner—John H. Mack
Assistant Examiner—H. A. Feeley
Attorney, Agent, or Firm—Robert Levine

[57]           ABSTRACT

A battery cell container is first hermetically sealed without the liquid electrolyte; and then the electrolyte is injected without breaking the hermetic seal.

7 Claims, 2 Drawing Figures

PATENTED FEB 18 1975         3,867,201
FIG. 1
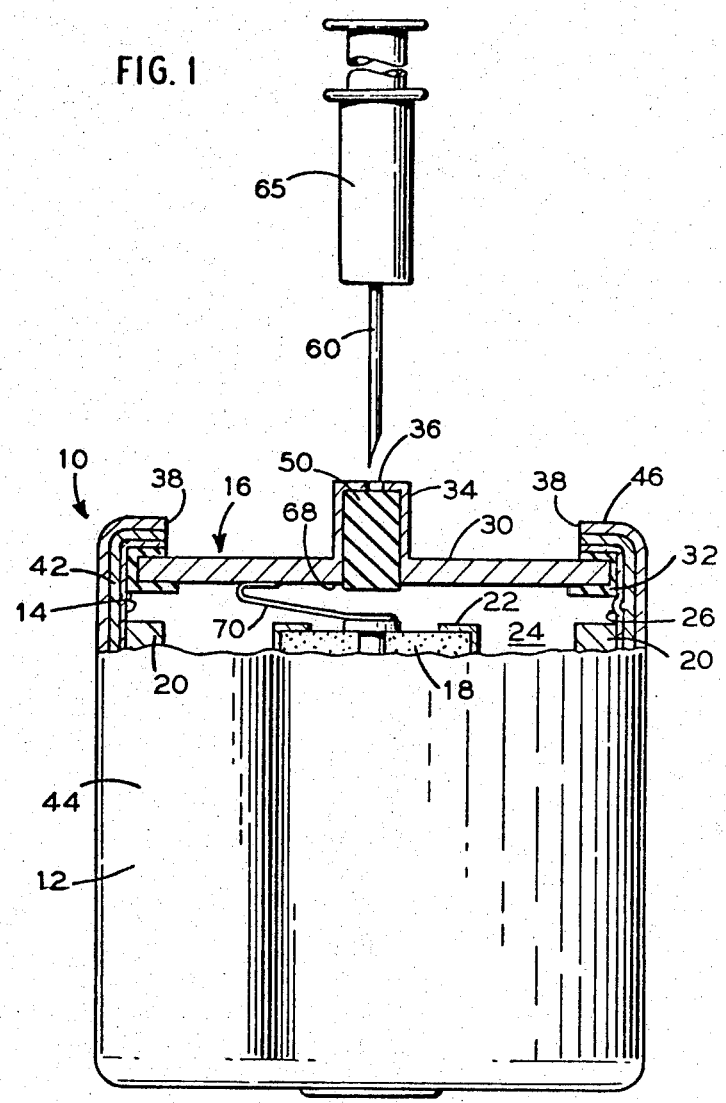
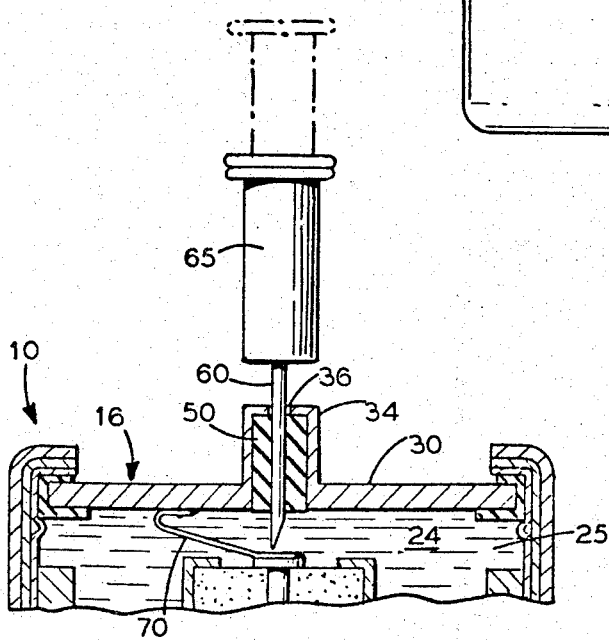
FIG. 2

HERMETICALLY SEALED ELECTROLYTE BATTERY AND METHOD OF FILLING WITHOUT BREAKING HERMETIC SEAL

This invention relates to an organic electrolyte battery which must be hermetically sealed.

Many problems are encountered when such batteries must be hermetically sealed. Such a problem arises when it is attempted to hermetically seal a cell after it has been filled with a volatile organic electrolyte. The problem is compounded if the cell is to withstand a high internal pressure. Such pressures might result from parasitic electrode reactions with electrolyte impurities, from increased solvent volatility due to high temperature storage, or from any other cause which would produce a positive internal pressure. Satisfactory seals for such cells have been unavailable, because they were either too elaborate or too expensive to make, or were unreliable.

The present invention is directed to a method of filling the cell, with a special construction of the cell, permitting first, hermetically sealing the cell and then filling the cell with electrolyte while maintaining the hermetic seal during and after the filling operation.

The object of the invention is to provide a simple and effective method of filling a sealed cell with an electrolyte, and to provide a simple structural arrangement that will assure a reliable seal for the cell while and after it is filled.

Another object of the invention is to provide a sealing method that is simple and that can be rapidly performed, and that is quite inexpensive in the mass production of such cells.

The invention generally utilizes a can-shaped container with a top closure, that provides a hermetic seal to the cell or battery, and that embodies a simple septum plug which is normally constructed and embodied to provide in itself a hermetic seal, but which is penetrable by a syringe needle, and used for that purpose, by which the electrolyte may be introduced into the cell. The septum plug is supported in and on the top closure, behind an opening in the top closure through which the syringe needle may be inserted into and through the septum plug. After the cell container is filled with the appropriate amount of the electrolyte, through said plug, the syringe needle is withdrawn, and the self-restoring character of the septum plug reseals the hole formed through the plug by the needle, and serves to restablish the hermetic seal for the container.

The construction of a cell and the manner in which the filling method is applied to such cell, are described herein, in connection with the single figure of the drawing, which shows schematically one form of cell structure in which a septum plug is provided to permit a simple filling operation to be performed, to fill the cell after it has otherwise been closed and hermetically sealed.

As is shown in the drawing, the invention is directed to a hermetically sealed electric battery cell, which comprises a closed and hermetically sealed container for the elements of the cell, and is constructed to permit the injection of a fluid electrolyte into the cell after it has been closed and hermetically sealed. The method of injection is such that the hermetic seal is maintained throughout the period during which the fluid electrolyte is injected, and the hermetic seal is maintained after such filling operation. The feature of the invention is that the original cell container can be more readily manipulated to establish the hermetic seal of the closed container before the fluid electrolyte is injected, and such seal is maintained during the filling operation, and thereby the hermetic seal remains permanent for the life of the battery.

FIG. 1 shows a verticle view partly in section of the cell before injection of the electrolyte.

FIG. 2 is a sectional view after injection of the electrolyte.

An electric battery that is constructed and filled during manufacture in accordance with the principles of this invention, as shown in the single figure of the drawing, comprises a container or can 12 originally closed at its bottom end 14, and open at its upper end 16, to permit the direct insertion, at the top of the can, of the structural components of the electrodes, which are schematically indicated as an internal anode structure 18 and a cathode structure 20, suitably separated by a conventional separator 22, with the space 24 left between the separator and the cathode structure 20 to receive a quantity of organic fluid electrolyte 25. The can 12 is shown also formed with an internal peripheral bead 26 to serve as a circular seat to receive a top closure member 30. That top closure 30 is shown here for simplicity and schematically as a metallic disc, whose rim is supported in an insulating gasket 32, and whose central portion is shaped in the form of an axially rising hollow concentric boss 34, provided with a central coaxial opening 36 through which a piercing needle may be inserted to inject the fluid electrolyte into the space 24 between the electrode elements 18 and 20.

After the electrode elements are appropriately disposed in the can 12, the top closure 30 is seated on the seating bead 26, and the can is appropriately peened over so its upper border edge 38 is pressed down on the insulating gasket 32 to tightly compress that insulating gasket between the peened over edge 38 and the seating bead 26. The pressure on the insulating gasket 32 between the peened over edge 38 and the bead 26 and the inner surface of the can, at the upper portion of the can where it is engaged by the gasket 32, is intended to and does assure the hermetic seal in this case.

In certain constructions, this can 12 may be disposed within an additional insulating wrapping or tubular structure 42, and the can with that insulating wrapper 42 is then enclosed in an additional metallic housing 44 whose upper end 46 may be utilized, when peened over, to add additional pressure to establish and maintain the hermetic seal at the top end of the can.

After the can has been thus closed and hermetically sealed, the filling operation is performed to inject the liquid electrolyte. To permit this operation to be performed, the original closure 30 is provided with a septum plug 50 that is tightly pressed into the hollow space of the hollow coaxial boss 34. The septum plug 50 is suitably retained in the hollow boss 34 to assure maintenance of a hermetic seal between the plug and the wall of the boss 34. The septum plug is made of a rubber material or compound which is compatible with the chemical environment within the cell. For example, silicone rubber may be used; and other material may be used if it is not attacked by the electrolyte. A bonded sandwich of two different rubbers may be used in which the outer rubber will protect the inner part of the plug from the electrolyte, while the material in the inner or central part of the plug will have a penetrable character to permit a fluid injection needle to be inserted and pressed through that portion of the plug. The characteristic that is required of the material for the septum plug is that it be compatible with the chemicals in the cell, and that it be penetrable by a needle, and that it be self-sealing after removal of the piercing needle.

After the complete cell with the septum plug has been fabricated in a controlled atmosphere, the electrolyte is introduced into the cell by means of a syringe needle 60 suitably coupled to a source of supply, indicated here for simplicity merely as a bulb. By means of this construction as shown, and the method of injecting the liquid into the cell space through the needle, which is pressed to pierce the rubber plug and to extend into the space that it fills, the filling operation of the cell is leak-proof and the hermetic seal is never broken throughout the filling operation, including the time of insertion of the needle and the subsequent withdrawing of the needle from the plug.

In order to withstand the pressure of the piercing operation, when the needle is pressed into and through the septum plug, the plug may be coupled and sealed to the hollow boss 34 within which it is contained, to assure that the septum plug will not be displaced.

A mechanical method of holding the septum plug 50 in place may utilize an operation of deforming the bottom of the closure 30 around the plug at the border region 68 so a portion of that metal closure 30 will be depressed radially inward against the rubber septum.

In another way the septum plug 50 may be glued in place with a cement that is compatible with the environment in the cell. In another modification, the hollow boss 34 may be swaged externally to provide mechanical compression on the septum plug.

Generally, the rubber used for this purpose will provide its own seal at the piercing hole after the piercing needle has been removed. For additional caution, if it may be desired, a suitable epoxy or glue may be applied to seal the needle hole formed in the rubber or a solder may be applied to bridge and close the hole 36 at the upper surface of the metal boss 34.

Since the boss 34 on the closure 30 will be utilized to serve as a terminal for the battery after completion, a suitable conductor 70 is shown connected between the anode material 18 and the bottom surface of the metallic closure 30.

Thus by means of the construction of the battery as shown, utilizing a septum plug as one hermetic seal element of the closure, the filling operation, as a step in the process of assembling and manufacturing of the battery, can be readily accomplished with an assurance that the hermetic seal remains unbroken during the filling operation and will continue after the completion of the filling operation and withdrawal of the needle.

The invention is not necessarily limited to the construction of the battery, but may be variously modified within the spirit and scope of the invention as defined in the claims.

What is claimed is:

1. An organic electrolyte battery, comprising
    a metallic can-shaped container;
    electrode elements of opposite polarities disposed therein;
    a fluid organic electrolyte immersing said electrode elements;
    a top closure for said container comprising an electrode terminal for said battery, said closure comprising a metallic disc having a central portion shaped in the form of an axially rising hollow concentric boss, the top surface of said boss having a coaxial opening;
    means electrically connecting said closure to an electrode element within said container;
    and a sealing element supported by said closure and contained within said hollow boss, said sealing element comprising a septum plug of rubber-like material penetrable by a needle and self-restoring and self-resealing upon removal of said needle, said sealing element serving as an inlet for said electrolyte during the filling operation, and then serving as an hermetic seal for said container.

2. An organic electrolyte battery, as in claim 1, in which
    said closure is insulatingly supported on said metallic container;
    and said electrode terminal on said closure supports said sealing element.

3. An electrolyte battery, as in claim 1, in which
    said electrode terminal supported on said closure is an integral part of said closure.

4. An electrolyte battery, as in claim 3, in which
    said electrode terminal is die-pressed from the body of said closure.

5. An electric battery, as in claim 1, in which
    said electrode terminal is a hollow shell with a top closure having a flat surface with a hole through said top closure to permit insertion of a filling needle therethrough into the cell space between the electrode elements of the cell for injection of the electrolyte through said needle.

6. An electric battery, as in claim 5, in which
    said plug of rubber-like material is physically held by and hermetically sealed to said electrode terminal shell, to permit penetration by a filling needle to inject a quantity of fluid electrolyte into the cell, and subsequent removal of the needle without breaking the hermetic seal of the cell.

7. The method of manufacturing an electric battery embodying electrode elements of opposite polarities and an organic liquid electrolyte, in an enclosing can with a top closure hermetically sealed at the top end of said can, said method comprising the steps of:
    disposing said electrode elements in said can while the top end of said can is open;
    disposing a top closure at the open end of said can, said top closure comprising an electrode terminal, and said top closure formed to further embody a rubber-like plug as a septum fill port, said septum plug hermetically sealed to the body of said top closure, with said rubber-like septum plug characterized to be penetrable by a needle and immediately self-sealing to hermetically seal and close said needle-formed hole when the needle is withdrawn;
    joining said top closure to said can to close and hermetically seal said can;
    and then injecting a stream of liquid organic electrolyte into said can, whereby the hermetic seal is unbroken by the insertion of said needle into, and withdrawal from, said septum fill plug.

* * * * *